United States Patent
Lundahl et al.

(10) Patent No.: US 11,235,356 B2
(45) Date of Patent: Feb. 1, 2022

(54) PACKAGE SORTING TRANSFER MODULES AND SYSTEMS AND METHODS THEREFOR

(71) Applicant: Regal Beloit America, Inc., Beloit, WI (US)

(72) Inventors: Robert D Lundahl, Frederick, MD (US); Robert W Cutlip, Millersville, MD (US); Mark G Bankard, Sykesville, MD (US); William D Finch, New Windsor, MD (US)

(73) Assignee: Regal Beloit America, Inc., Beloit, WI (US)

( * ) Notice: Subject to any disclaimer, the term of this patent is extended or adjusted under 35 U.S.C. 154(b) by 466 days.

(21) Appl. No.: 15/916,248

(22) Filed: Mar. 8, 2018

(65) Prior Publication Data
US 2018/0257110 A1 Sep. 13, 2018

Related U.S. Application Data

(60) Provisional application No. 62/468,812, filed on Mar. 8, 2017.

(51) Int. Cl.
*B07C 5/36* (2006.01)
*B65G 17/24* (2006.01)
(Continued)

(52) U.S. Cl.
CPC ............... *B07C 5/36* (2013.01); *B65G 17/24* (2013.01); *B65G 13/06* (2013.01); *B65G 15/46* (2013.01)

(58) Field of Classification Search
CPC .......... B07C 5/36; B65G 15/46; B65G 17/24; B65G 13/06; B65G 13/07
See application file for complete search history.

(56) References Cited

U.S. PATENT DOCUMENTS

| 1,353,874 A | 9/1920 | Wego |
| 2,983,352 A | 5/1961 | Flora et al. |

(Continued)

FOREIGN PATENT DOCUMENTS

| CN | 101171189 A | 4/2008 |
| CN | 202245193 U | 5/2012 |

(Continued)

OTHER PUBLICATIONS

HAIRISE, Wholesale Har2253 0 USD sample replacement parts transportation belt conveyor belt conveyor system belt, Alibaba.com, accessed in Nov. 2016, in 2 pages.

(Continued)

*Primary Examiner* — Charles A Fox
*Assistant Examiner* — Kalyanavenkateshware Kumar
(74) *Attorney, Agent, or Firm* — Knobbe, Martens, Olson & Bear, LLP (57) ABSTRACT

A transfer module assembly includes a frame, a conveyor belt with internal rotating elements, where the conveyor belt is supported by the frame, conveyor drive rollers supported by the frame and configured to drive the conveyor belt, a flat transfer belt mounted beneath the conveyor belt and configured to contact undersides of the internal rotating elements of the conveyor belt in operation, and flat transfer belt drive rollers supported by the frame and configured to drive the flat transfer belt. The conveyor drive rollers are friction-based and operate without use of a sprocket, and comprise depressions for receiving the internal rotating elements of the conveyor belt.

21 Claims, 4 Drawing Sheets

(51) Int. Cl.
*B65G 15/46* (2006.01)
*B65G 13/06* (2006.01)

(56) References Cited

U.S. PATENT DOCUMENTS

| | | | |
|---|---|---|---|
| 3,204,680 A | 7/1965 | Barry | |
| 3,252,556 A | 5/1966 | Sven-eric | |
| 3,593,591 A | 7/1971 | Chantland | |
| 3,768,614 A | 10/1973 | Tabler | |
| 3,934,953 A | 1/1976 | Tooley | |
| 4,008,800 A | 2/1977 | Forsyth | |
| 4,059,180 A | 11/1977 | Krivec et al. | |
| 4,100,368 A | 7/1978 | Thomsen | |
| 4,101,180 A | 7/1978 | Anderson et al. | |
| 4,148,386 A | 4/1979 | Bradbury | |
| 4,168,771 A | 9/1979 | Krivec | |
| 4,221,288 A | 9/1980 | Rae | |
| 4,301,915 A | 11/1981 | Michalik et al. | |
| 4,372,441 A | 2/1983 | Hans et al. | |
| 4,383,605 A | 5/1983 | Harwick | |
| 4,418,817 A | 12/1983 | Martin et al. | |
| 4,448,302 A | 5/1984 | Weaver et al. | |
| 4,476,974 A | 10/1984 | Bradbury | |
| 4,508,212 A | 4/1985 | Bolle et al. | |
| 4,577,747 A | 3/1986 | Martin | |
| 4,664,243 A | 5/1987 | Martin | |
| 4,681,203 A | 7/1987 | Kornylak | |
| 4,681,215 A | 7/1987 | Martin | |
| 4,815,588 A | 3/1989 | Katsuragi et al. | |
| 4,925,009 A | 5/1990 | Hill et al. | |
| 5,080,219 A | 1/1992 | Imai et al. | |
| 5,129,507 A | 1/1992 | Maeda et al. | |
| 5,096,045 A | 3/1992 | Feldl | |
| 5,163,210 A | 11/1992 | Lostra | |
| 5,188,210 A | 2/1993 | Malow | |
| 5,222,920 A | 6/1993 | Cheesman et al. | |
| 5,228,820 A | 7/1993 | Stansfield et al. | |
| 5,238,099 A | 8/1993 | Schroeder et al. | |
| 5,240,102 A | 8/1993 | Lucas | |
| 5,261,525 A | 11/1993 | Gabagnati | |
| 5,289,913 A | 3/1994 | Fujio et al. | |
| 5,361,884 A | 11/1994 | Yonezawa | |
| 5,427,218 A | 6/1995 | Yonezawa | |
| 5,597,156 A | 1/1997 | Classen | |
| 5,609,238 A | 3/1997 | Christensen | |
| 5,634,550 A | 6/1997 | Ensch et al. | |
| 5,645,155 A | 7/1997 | Houghton | |
| 5,653,325 A | 8/1997 | Enomoto | |
| 5,701,992 A | 12/1997 | Enomoto | |
| 5,735,388 A | 4/1998 | Brouwer | |
| 5,810,158 A | 9/1998 | Schiesser et al. | |
| 5,850,902 A | 12/1998 | Hicks et al. | |
| 5,860,784 A | 1/1999 | Schuitema et al. | |
| 5,862,907 A | 1/1999 | Taylor | |
| 5,868,238 A | 2/1999 | Bonnet | |
| 5,911,306 A | 6/1999 | Ferrari | |
| 5,918,723 A | 7/1999 | Schuitema et al. | |
| 5,927,465 A | 7/1999 | Shearer, Jr. | |
| 5,971,618 A | 10/1999 | Ledingham | |
| 6,008,556 A | 12/1999 | Ramthun | |
| 6,041,909 A | 3/2000 | Shearer, Jr. | |
| 6,056,107 A | 5/2000 | Schuitema et al. | |
| 6,065,588 A | 5/2000 | Cotter et al. | |
| 6,068,105 A | 5/2000 | Darwish et al. | |
| 6,112,875 A | 9/2000 | Gibson | |
| 6,126,017 A | 10/2000 | Hours | |
| 6,138,819 A | 10/2000 | Bogle et al. | |
| 6,139,240 A | 10/2000 | Ando | |
| 6,148,990 A | 11/2000 | Lapeyre et al. | |
| 6,168,544 B1 | 1/2001 | Barnes et al. | |
| 6,196,375 B1 | 3/2001 | Cozza | |
| 6,209,714 B1 | 4/2001 | Lapeyre et al. | |
| 6,269,939 B1 | 8/2001 | Lapeyre et al. | |
| 6,318,544 B1 | 11/2001 | O'Connor et al. | |
| 6,343,685 B1 | 2/2002 | Hofer | |
| 6,359,247 B1 | 3/2002 | Lem et al. | |
| 6,367,616 B1 | 4/2002 | Lapeyre et al. | |
| 6,370,447 B1 | 4/2002 | Miyazaki | |
| 6,390,756 B1 | 5/2002 | Isaacs et al. | |
| 6,398,015 B1 | 6/2002 | Sedlacek et al. | |
| 6,454,082 B1 | 9/2002 | McTaggart et al. | |
| 6,471,043 B2 | 10/2002 | Schwingshandl et al. | |
| 6,493,939 B2 | 12/2002 | Ledingham | |
| 6,494,312 B2 | 12/2002 | Costanzo | |
| 6,533,099 B2 | 3/2003 | Bonham et al. | |
| 6,550,609 B2 | 4/2003 | Coen et al. | |
| 6,568,522 B1 | 5/2003 | Boelaars | |
| 6,571,937 B1 | 6/2003 | Costanzo et al. | |
| 6,578,697 B2 | 6/2003 | Bonham et al. | |
| 6,688,459 B1 | 2/2004 | Bonham et al. | |
| 6,705,452 B2 | 3/2004 | Greve et al. | |
| 6,732,849 B2 | 5/2004 | Yamamoto | |
| 6,752,534 B2 | 6/2004 | Ledingham | |
| 6,758,323 B2 | 7/2004 | Costanzo | |
| 6,860,376 B1 | 3/2005 | Heit et al. | |
| 6,889,822 B1 | 5/2005 | Wagner et al. | |
| 6,932,211 B2 | 6/2005 | Wieting et al. | |
| 6,923,309 B2 | 8/2005 | Costanzo | |
| 6,997,306 B2 | 2/2006 | Sofranec et al. | |
| 6,997,309 B2 | 2/2006 | Stebnicki et al. | |
| 7,007,792 B1 | 3/2006 | Burch | |
| 7,011,208 B2 * | 3/2006 | Nakashima | B65G 15/64 198/840 |
| 7,040,480 B2 | 5/2006 | Sedlacek | |
| 7,055,669 B2 | 6/2006 | Veit | |
| 7,111,722 B2 | 9/2006 | Burch | |
| 7,117,988 B2 | 10/2006 | Veit et al. | |
| 7,124,876 B2 | 10/2006 | Wolf | |
| 7,128,197 B2 | 10/2006 | Haan | |
| 7,131,531 B1 | 11/2006 | Ryan | |
| 7,137,505 B2 | 11/2006 | Stebnicki et al. | |
| 7,145,095 B2 | 12/2006 | Cerutti et al. | |
| 7,147,097 B2 | 12/2006 | Lemm | |
| 7,191,894 B2 | 3/2007 | Costanzo et al. | |
| 7,198,145 B1 | 4/2007 | Brown et al. | |
| 7,213,701 B2 | 5/2007 | Deur | |
| 7,216,759 B2 | 5/2007 | Rau et al. | |
| 7,237,670 B1 | 7/2007 | Ryan | |
| 7,240,781 B2 | 7/2007 | Ramaker et al. | |
| 7,246,700 B2 | 7/2007 | Stebnicki et al. | |
| 7,249,669 B2 | 7/2007 | Fourney | |
| 7,249,671 B2 | 7/2007 | Riddick et al. | |
| 7,252,192 B2 | 8/2007 | Stebnicki et al. | |
| 7,284,653 B2 | 10/2007 | Fourney et al. | |
| 7,284,654 B2 | 10/2007 | Affaticati et al. | |
| 7,290,649 B2 | 11/2007 | Wolkerstorfer | |
| 7,306,086 B2 | 12/2007 | Boelaars | |
| 7,331,448 B2 | 2/2008 | Stebnicki et al. | |
| 7,334,676 B1 | 2/2008 | McGourin et al. | |
| 7,344,018 B2 | 3/2008 | Costanzo et al. | |
| 7,360,641 B1 | 4/2008 | Fourney | |
| 7,364,038 B2 | 4/2008 | Damkjaer | |
| 7,383,935 B2 | 6/2008 | Tasma et al. | |
| 7,398,874 B2 | 7/2008 | Deur | |
| 7,419,043 B2 | 9/2008 | Veit | |
| 7,422,098 B2 | 9/2008 | Bonham et al. | |
| 7,426,992 B2 | 9/2008 | Fourney | |
| 7,441,646 B2 | 10/2008 | Heit et al. | |
| 7,461,739 B2 | 12/2008 | Fourney | |
| 7,467,708 B2 | 12/2008 | McGettigan et al. | |
| 7,497,316 B2 | 3/2009 | Hysell et al. | |
| 7,506,750 B2 | 3/2009 | Costanzo et al. | |
| 7,506,751 B2 | 3/2009 | Fourney | |
| 7,513,356 B2 | 4/2009 | Veit et al. | |
| 7,516,835 B2 | 4/2009 | Neiser et al. | |
| 7,527,146 B2 | 5/2009 | Stebnicki et al. | |
| 7,530,441 B2 | 5/2009 | Zimmer | |
| 7,533,766 B1 | 5/2009 | Fourney | |
| 7,537,104 B2 | 5/2009 | Riddick et al. | |
| 7,537,105 B2 | 5/2009 | Fourney | |
| 7,537,106 B2 | 5/2009 | Fourney | |
| 7,540,368 B2 | 6/2009 | Weiser | |
| 7,549,527 B2 | 6/2009 | Neiser et al. | |
| 7,556,136 B2 | 7/2009 | Marshall et al. | |

(56) References Cited

U.S. PATENT DOCUMENTS

| | | |
|---|---|---|
| 7,556,142 B2 | 7/2009 | Stebnicki et al. |
| 7,562,761 B2 | 7/2009 | Tasma et al. |
| 7,563,188 B2 | 7/2009 | Ozaki et al. |
| 7,581,632 B2 | 9/2009 | Wallace et al. |
| 7,588,137 B2 | 9/2009 | Fourney |
| 7,591,366 B2 | 9/2009 | Taylor |
| 7,604,110 B2 | 10/2009 | Deur |
| 7,607,533 B2 | 10/2009 | Pressler et al. |
| 7,617,923 B2 | 11/2009 | Riddick et al. |
| 7,681,710 B2 | 3/2010 | Kuhn et al. |
| 7,690,497 B2 | 4/2010 | Radwallner et al. |
| 7,725,213 B2 | 5/2010 | Hysell et al. |
| 7,726,461 B2 | 6/2010 | Risley |
| 7,731,010 B2 | 6/2010 | Kissee et al. |
| 7,743,905 B2 | 6/2010 | Fourney |
| 7,748,514 B2 | 7/2010 | Shimizu |
| 7,779,986 B2 | 8/2010 | Enomoto |
| 7,784,601 B2 | 8/2010 | Riddick et al. |
| 7,841,461 B2 | 11/2010 | Nguyen et al. |
| 7,854,314 B2 | 12/2010 | Pelak et al. |
| 7,857,116 B2 | 12/2010 | Heit et al. |
| 7,861,847 B2 | 1/2011 | Fourney et al. |
| 7,861,849 B2 | 1/2011 | Fourney |
| 7,863,536 B2 | 1/2011 | Cerutti et al. |
| 7,874,418 B2 | 1/2011 | Steinsträter |
| 7,878,319 B2 | 2/2011 | Costanzo et al. |
| 7,886,892 B2 | 2/2011 | Fourney |
| 7,891,481 B2 | 2/2011 | Pressler et al. |
| 7,905,345 B2 | 3/2011 | Taylor |
| 7,942,257 B2 | 5/2011 | DePaso et al. |
| 7,971,701 B2 | 7/2011 | Fourney |
| 7,992,701 B2 | 8/2011 | Wolf |
| 8,060,245 B2 | 11/2011 | Lupton et al. |
| 8,079,462 B2 | 12/2011 | Pelak et al. |
| 8,100,252 B2 | 1/2012 | Fourney |
| 8,104,606 B2 | 1/2012 | Rogers et al. |
| 8,109,384 B2 | 2/2012 | Pressler et al. |
| 8,123,021 B2 | 2/2012 | DePaso et al. |
| D657,807 S | 4/2012 | Frazier |
| 8,167,111 B2 | 4/2012 | Asman |
| 8,167,118 B2 | 5/2012 | Fourney |
| 8,172,069 B2 | 5/2012 | Prakasam |
| 8,186,031 B2 | 5/2012 | Whitney et al. |
| 8,186,499 B2 | 5/2012 | Brandt et al. |
| 8,196,736 B2 | 6/2012 | Wagner |
| 8,205,738 B1 | 6/2012 | Fourney |
| 8,308,368 B2 | 11/2012 | Blair et al. |
| D672,794 S | 12/2012 | Frazier |
| 8,342,313 B2 | 1/2013 | Wargo et al. |
| 8,364,307 B2 | 1/2013 | Carlson et al. |
| 8,371,431 B2 | 2/2013 | Neiser et al. |
| 8,424,675 B2 | 4/2013 | Rau |
| 8,459,440 B2 | 6/2013 | Onayama |
| 8,469,177 B2 | 6/2013 | Steenwyk |
| 8,469,178 B2 | 6/2013 | Butler |
| 8,474,596 B2 | 7/2013 | Wolkerstorfer et al. |
| 8,474,602 B2 | 7/2013 | Miller |
| 8,496,105 B2 | 7/2013 | MacLachlan et al. |
| 8,499,926 B2 | 8/2013 | Steinsträter |
| 8,511,460 B2 | 8/2013 | Ragan et al. |
| 8,528,742 B2 | 9/2013 | Wargo et al. |
| 8,534,172 B2 | 9/2013 | Fourney |
| 8,573,389 B2 | 11/2013 | Stebnicki et al. |
| 8,579,105 B2 | 11/2013 | Butler et al. |
| 8,622,202 B2 | 1/2014 | Rau et al. |
| 8,646,595 B2 | 2/2014 | Miller et al. |
| 8,720,668 B2 | 5/2014 | Ragan et al. |
| 8,746,442 B2 | 6/2014 | Schwai |
| 8,753,060 B2 | 6/2014 | Ueda et al. |
| 8,757,353 B2 | 6/2014 | Nieser et al. |
| 8,763,788 B2 | 7/2014 | Neiser |
| 8,763,789 B2 | 7/2014 | Wallace |
| 8,776,982 B2 | 7/2014 | Onayama |
| 8,790,061 B2 | 7/2014 | Yamashita |
| 8,813,943 B2 | 8/2014 | Ramankutty et al. |
| 8,820,520 B2 | 9/2014 | Triesenberg et al. |
| 8,825,205 B2 | 9/2014 | Yokota et al. |
| 8,862,306 B2 | 10/2014 | Yokota et al. |
| 8,899,407 B2 | 12/2014 | Harrington |
| 8,915,353 B2 | 12/2014 | Fourney |
| 8,919,542 B2 | 12/2014 | Triesenberg et al. |
| 8,973,506 B2 | 3/2015 | Yamashita |
| 8,978,879 B2 | 3/2015 | Fourney |
| 8,983,651 B2 | 3/2015 | Combs et al. |
| 8,985,304 B2 | 3/2015 | Guernsey et al. |
| 9,004,264 B2 | 4/2015 | Baek, IV et al. |
| 9,016,456 B1 | 4/2015 | Neiser et al. |
| 9,020,632 B2 | 4/2015 | Naylor |
| 9,037,290 B2 | 5/2015 | Neiser et al. |
| 9,038,809 B2 | 5/2015 | Wilkins et al. |
| 9,073,703 B2 | 7/2015 | Fourney |
| 9,079,717 B1 | 7/2015 | Costanzo et al. |
| 9,096,379 B2 | 8/2015 | Gilley et al. |
| 9,108,807 B1 | 8/2015 | Ogle, II |
| 9,150,362 B2 | 10/2015 | Vegh et al. |
| 9,156,629 B2 | 10/2015 | Costanzo et al. |
| 9,193,533 B2 | 11/2015 | Fourney |
| 9,199,802 B2 | 12/2015 | Neiser et al. |
| 9,216,862 B2 | 12/2015 | Wallace et al. |
| 9,227,785 B2 | 1/2016 | Chinnock et al. |
| 9,233,803 B2 | 1/2016 | Pilarz et al. |
| 9,254,930 B2 | 2/2016 | Cremer |
| 9,290,333 B2 | 3/2016 | Skanse et al. |
| 9,302,855 B2 | 4/2016 | Guernsey et al. |
| 9,309,054 B2 | 4/2016 | Scates |
| 9,309,058 B2 | 4/2016 | Maglaty |
| 9,315,341 B2 | 4/2016 | Ieist |
| 9,327,916 B2 | 5/2016 | DeRoche |
| 9,334,113 B2 | 5/2016 | Naylor |
| 9,340,357 B2 | 5/2016 | Wilkins et al. |
| 9,371,194 B2 | 6/2016 | Ragan |
| 9,399,558 B2 | 7/2016 | Guernsey et al. |
| 9,409,727 B2 | 8/2016 | German |
| 9,428,338 B2 | 8/2016 | Ragan |
| 9,434,547 B2 | 9/2016 | Marshall et al. |
| 9,452,896 B2 | 9/2016 | Lee |
| 9,457,961 B2 | 10/2016 | Green, III |
| 9,463,931 B2 | 10/2016 | Nagel et al. |
| 9,469,486 B2 | 10/2016 | German |
| 9,471,009 B2 | 10/2016 | Kikuchi et al. |
| 9,481,516 B1 | 11/2016 | Kraus et al. |
| 9,493,308 B2 | 11/2016 | Hoynash et al. |
| 9,493,313 B2 | 11/2016 | Vegh |
| 9,499,346 B2 | 11/2016 | Triensenberg et al. |
| 9,555,972 B2 | 1/2017 | Ishikawa et al. |
| 9,555,976 B2 | 1/2017 | Eure et al. |
| 9,567,164 B2 | 2/2017 | Kirkpatrick et al. |
| 9,573,772 B2 | 2/2017 | Fourney |
| 9,586,763 B2 | 3/2017 | Reischl |
| 9,592,983 B2 | 3/2017 | Costanzo et al. |
| 9,624,043 B2 | 4/2017 | Koetje et al. |
| 9,630,784 B2 | 4/2017 | Ragan |
| 9,741,009 B2 | 8/2017 | Berghorn et al. |
| 9,745,143 B2 | 8/2017 | Wilkins |
| 9,751,695 B2 | 9/2017 | DeGroot et al. |
| 9,776,800 B2 | 10/2017 | Westergaard Andersen |
| 9,776,806 B2 | 10/2017 | Reischl |
| 9,815,632 B2 | 11/2017 | DePaso et al. |
| 9,828,187 B2 | 11/2017 | Chierego et al. |
| 9,878,856 B2 | 1/2018 | Specht |
| 9,988,218 B2 | 6/2018 | Dugat et al. |
| 10,221,020 B2 | 3/2019 | Menke et al. |
| 10,239,704 B2 | 3/2019 | Messner |
| 10,532,894 B2 | 1/2020 | Kuhn |
| 10,640,303 B2 | 5/2020 | Kuhn |
| 2001/0014190 A1 | 8/2001 | Ledingham |
| 2004/0007439 A1 | 1/2004 | Wolkerstorfer |
| 2004/0201160 A1 | 10/2004 | Nakashima |
| 2005/0155846 A1 | 7/2005 | Sofranec et al. |
| 2006/0038452 A1 | 2/2006 | Lesak |
| 2006/0076216 A1 | 4/2006 | Wagner et al. |
| 2006/0219526 A1 | 10/2006 | Costanzo et al. |
| 2006/0225284 A1 | 10/2006 | Byerly et al. |
| 2006/0260917 A1 | 11/2006 | Ozaki et al. |

(56) References Cited

U.S. PATENT DOCUMENTS

| | | |
|---|---|---|
| 2007/0007108 A1 | 1/2007 | Veit |
| 2007/0119690 A1 | 5/2007 | Lupton |
| 2008/0121498 A1 | 5/2008 | Costanzo |
| 2008/0302634 A1 | 12/2008 | Costanzo et al. |
| 2009/0008218 A1 | 1/2009 | Fourney |
| 2009/0039592 A1 | 2/2009 | Jans et al. |
| 2009/0152074 A1 | 6/2009 | Wolf |
| 2009/0314608 A1 | 12/2009 | Rogers et al. |
| 2010/0193329 A1 | 8/2010 | Wargo |
| 2011/0022221 A1 | 1/2011 | Fourney |
| 2011/0297509 A1 | 12/2011 | Taylor |
| 2012/0080290 A1 | 4/2012 | Fourney |
| 2012/0125735 A1 | 5/2012 | Schuitema et al. |
| 2012/0298481 A1 | 11/2012 | Fourney |
| 2012/0318644 A1 | 12/2012 | Maclachlan et al. |
| 2015/0026983 A1 | 1/2015 | Eure et al. |
| 2015/0144536 A1 | 5/2015 | Dugat |
| 2016/0039611 A1 | 2/2016 | Hoynash et al. |
| 2016/0114980 A1 | 4/2016 | Ishikawa et al. |
| 2016/0159581 A1 | 6/2016 | Fourney |
| 2016/0167885 A1 | 6/2016 | Westergaard Andersen |
| 2016/0200525 A1 | 7/2016 | Coullery |
| 2016/0257499 A1 | 9/2016 | Cribiu |
| 2016/0270562 A1 | 9/2016 | McPherson et al. |
| 2016/0288172 A1 | 10/2016 | Wargo |
| 2016/0325315 A1 | 11/2016 | Zimmer et al. |
| 2017/0034653 A1 | 2/2017 | Ambrefe |
| 2017/0066595 A1 | 3/2017 | Fourney |
| 2017/0144843 A1 | 5/2017 | Pedersen et al. |
| 2017/0330135 A1 | 11/2017 | Taylor et al. |
| 2017/0334661 A1 | 11/2017 | Stefanko et al. |
| 2017/0349383 A1 | 12/2017 | Myers et al. |
| 2018/0257872 A1 | 9/2018 | Kuhn |
| 2019/0152720 A1 | 5/2019 | Kuhn |
| 2019/0185272 A1 | 6/2019 | Fumagalli et al. |
| 2020/0307921 A1 | 10/2020 | Kuhn |
| 2021/0078808 A1 | 3/2021 | Kuhn |

FOREIGN PATENT DOCUMENTS

| | | |
|---|---|---|
| CN | 102849449 A | 1/2013 |
| CN | 205739576 U | 11/2016 |
| CN | 110636981 A | 12/2019 |
| EP | 0068475 A2 | 1/1983 |
| EP | 0438667 A2 | 7/1991 |
| EP | 0560480 A2 | 9/1993 |
| GB | 1554539 A | 10/1979 |
| JP | 2005-138918 A | 6/2005 |
| JP | 2009-292601 A | 12/2009 |
| JP | 2012/121693 A | 6/2012 |
| WO | WO 2006/121749 A1 | 11/2006 |
| WO | WO 2018/165489 A1 | 9/2018 |
| WO | WO 2018/165609 A1 | 9/2018 |
| WO | WO 2019/104095 A2 | 5/2019 |

OTHER PUBLICATIONS

HAIRISE, Wholesale Side transfer universal ball modular plastic conveyor belt, Alibaba.com, accessed in Nov. 2016, in 6 pages.

HAIRISE, Wholesale 2253 flexible universal ball belt, Alibaba.com, accessed in Nov. 2016, in 4 pages.

HAIRISE, Wholesale Buy Best from Wholesaler Alibaba.com, accessed in Nov. 2016, in 2 pages.

Power Transmission Solutions, "ModSort™ Station Solves Transfer and Division," YouTube video, Oct. 2016, title page in 2 pages and screenshots in 41 pages.

Power Transmission Solutions, "System Plast 2253 Roller Top Belt for Unit Handling," YouTube video, Mar. 2015, title page in 2 pages and screenshots in 46 pages.

System Plast ModSort Right Angle Transfer Module Brochure, 2016.

Regal to Launch MODSORT at Pack Expo., Sep. 2016.

Extended Search Report in corresponding European Patent Application No. 18763241.9, dated Nov. 20, 2020, in 14 pages.

International Search Report and Written Opinion from corresponding International Patent Application No. PCT/US2018/021633, dated Jun. 1, 2018, in 2 pages.

International Preliminary Report on Patentability from corresponding International Patent Application No. PCT/US2018/021633, dated Sep. 19, 2019, in 8 pages.

Office Action in corresponding Chinese Patent Application No. 201880023408.7, dated Aug. 27, 2020, in 20 pages.

\* cited by examiner

PACKAGE SORTING TRANSFER MODULES AND SYSTEMS AND METHODS THEREFOR

This application claims the benefit of U.S. Provisional Patent Application Ser. No. 62/468,812, filed Mar. 8, 2017, which is hereby incorporated by reference herein in its entirety.

FIELD OF THE DISCLOSURE

The present disclosure relates generally to material handling systems and specifically to plastic conveyor belts with rotating elements and simple drive components used to configure individual transfer modules that can be used to divert and sort letters, bundles, packages, parcels, etc.

BACKGROUND

The volume of products being transported and sorted by material handling systems has increased dramatically in the United States and the developing world. Much of this volume increase can be attributed to the rise of "fulfillment centers" where goods are sorted for distribution to businesses and customers through a variety of distribution channels.

Automatic sorter systems are one of the key technologies that enable these organizations to handle the tremendous volume of packages and collect them by destination as they move from sender to receiver. High speed, low cost, and automated operations are key technologies for efficiency and competitiveness in this business. Two of the most common sorter types are the "LOOP" sorter and the "LINEAR" sorter.

A loop sorter is typically housed in a large building and it resembles a small train with multiple package-holding segments (hereinafter "cars" or "sorter trays") moving around a closed loop at speed. At one part of the loop, packages are moved onto individual cars of the sorter at what are called "induction stations". As the sorter cars move around the loop there are a multitude of locations called "sort points" where the contents of the train can be moved off, or sorted, into a waiting container or subsequent conveyors. Various technologies are used to "move off" the product from the sorter car and they include tipping the car to the side, driving a transverse conveyor belt that is on top of the car, or dropping the product through the car with bomb bay doors.

Linear sorters perform the same transport and sorting function as loop sorters. This style of sorter inducts product onto a single straight-line conveyor where packages can be expelled to containers positioned on the right or left of the sorter spine. The conveyor itself has features that move packages to the right or left at a precise time to discharge into a waiting container designated by the sorter system. Typical discharge methods include "Shoe Sorters," where features on the conveyor move right or left to move the package, and "Pushers," where some external actuator interfaces with the package and pushes it off of the sorter to the right or left.

Recently there is a family of sorters that use a linked plastic conveyor belt with rotating elements embedded in the conveyor belt structure, such as is disclosed in published patent application US2011/0022221. The tops of the rotating elements contact the product being transported and the bottoms of the rotating elements contact fixed or moving features underneath the conveyor belt itself. When these rotating elements touch features underneath the conveyor belt, their rotational behavior can be changed and this will change the resultant movement of the product on the top surface. These sorters are typically constructed from a single length of plastic conveyor belt with multiple zones where features underneath the conveyor can activate and divert the product off of the main flow. The length of these sorters requires a much more powerful drive system and the entire conveyor belt must stay in motion to move product over the length of the sorter.

Needs exist for improved sorting systems and methods.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new low-cost method allows for the construction of individual transfer modules that can be used singularly to transfer packages. These same transfer modules can be combined with other modules to create a sorter of nearly any length or size. Each transfer module has its own simple drive system that can use smaller and lower-powered components for each of the individual modules instead of the large centralized high-powered drive systems used in the large linear or loop sorters. Each transfer module can be operated independently so that product can be moved by just powering the module when the product is present. The design and operation of the transfer modules offers many benefits including lower cost, lower noise, lower wear, and fewer alignment issues. Constructing sorters from these individual transfer modules has the added benefit of installation flexibility, lower power consumption, and the ability to change the size and configurations in the future.

A transfer module can be configured from a length of plastic conveyor belt where the conveying surface incorporates a multitude of freely rotating balls whose surface extends slightly above and below the belt. These rotating elements may be freely rotating spheres or a roller with an axle mounted in a rotating assembly with a geometry that causes the assembly, with the roller, to turn in response to a compound movement of the conveyor belt riding over a secondary moving belt underneath. The plastic conveyor belt runs in a continuous loop over a support surface that causes the balls to rotate from their contact with the surface underneath. A package on the top surface is propelled by touching a multitude of the balls and its speed is also increased because of the tangential velocity of the rotating elements combined with the translational speed of the conveyor belt itself.

A second flat belt is positioned underneath as the support structure for the rotating elements of the plastic conveyor belt. Using a belt is a cost-effective approach to contact a wide area of rotating elements. When the second flat belt is moved it will impart a compound motion to the rotating elements of the plastic conveyor belt which will cause a package riding on the top of the rotating elements to change directions.

One specific configuration is to orient the second flat belt at 90 degrees to the direction of motion of the plastic conveyor belt with the rotating elements. When the second flat belt is moved to the right or to the left it will impart a motion to the rotating elements of the plastic conveyor belt to move a package on the conveying surface to the right or left directions. A computer control system activates the secondary belt at the correct time. When the belts are controlled by a control system, this change in direction can be used to move the packages off and onto different conveyor sections and thus sort the package to a different path.

If many transfer modules are set up in series, the control system can track individual packages and control individual transfer modules to create a sorter system. This modular approach to a sorter system is different from the traditional loop sorters or linear sorters and allows a high degree of customization to meet the operational constraints of where they can be installed. Modules can be added or taken away as the sortation requirements change in the future. Modules can be grouped in specific areas along a conveyor line and other features, such as curves, inclines, and elevators, can be incorporated into the overall sorter installation.

Features of the modular concept include the physical ability to transfer product between modules and a low-cost drive system for the multiple individual transfer modules. The traditional method used to drive the plastic conveyor belt is to use a multitude of sprocket type elements mounted on a common shaft at both ends of the conveyor section. The sprocket elements engage with features in the plastic conveyor belt. The sprocket shaft can be powered by a belt drive, gear drive, internal motor, or other means to provide power to rotate the sprockets and move the plastic conveyor belt.

Some embodiments of the present invention replace the sprocket drive system with a friction-based approach using a specially contoured roller that is driven by a belt drive, gear drive, internal motor, or other means. The contoured roller has specific features to accommodate the plastic conveyor belt, providing both friction surfaces to propel the plastic belt and clearances for the roller elements.

The contoured roller is designed to interface with the geometry of the plastic roller belt. A simple design can be a cylindrical roller of high friction material that has been shaped to incorporate cylindrical grooves along its length to allow clearances for the rows of rotating elements of the plastic belt. The depth of these grooves can be selected depending on the application. For very small packages, the depth of the groove can be engineered so that the rotating elements contact the roller inside the groove to prevent them from rotating at the same time as the remaining surface of the roller maintains contact with the plastic belt itself. In this way a very small package can be moved by the rotating element and will continue to move by translation alone around the drive roller when the rotating elements are "locked" by contact with the roller groove. Using this approach, a "dead zone" can be avoided where the rotating elements turn freely and provide no motive power to the package.

The contoured friction drive roller has many other benefits in the design and construction of a plastic conveyor system with rotating elements. A friction drive roller can be fabricated inexpensively by adding a covering to existing drive rollers. This feature can be easily added to a motorized drive roller (MDR), which is a common drive element used in many modern conveyor systems.

The diameter of the friction drive with the added covering can be kept to a minimum, since there are no sprocket teeth required. Minimizing the diameter allows multiple conveyor sections to be placed end to end while minimizing the discontinuity in the transition between conveying surfaces, therefore accommodating smaller packages.

The design of the transfer module is simplified, since the friction drive rollers can propel the plastic conveyor using friction that is maintained by the small catenary force of the return conveyor hanging underneath and between the rollers. There is no need to have a tensioning mechanism or to perform frequent adjustments.

Sprocket-type drive systems are prone to wear due to the mechanical interface, and they require careful tensioning. Sprocket teeth can wear as well as the pitch length of the plastic conveyor itself. Either condition can require the replacement of both the chain and the sprocket.

The friction drive proposed in some embodiments of the present invention does not have this limitation. The contact position is arbitrary, and as a result not sensitive to wear or pitch length.

Sprocket drives also make more noise, since there is a mechanical interface between sprocket teeth and the plastic conveyor. This is a noted drawback for the commercial use of large sprocket drive systems that must run continuously with workers sharing the same work space. The friction drive system provides a smoother power transmission that is quiet and does not change with wear.

The secondary flat belt that is activated to change the direction of the package being transported has specific features to enable this method of package transfer. The secondary flat belt will frequently be activated while the plastic conveyor belt with rotating features is in motion. Moving both belts at the same time will frequently perform the transfer motion at the greatest speed. This is important in a sorter application where sortation rates are critical to the overall operations. Moving both belts at the same time imparts a significant side loading to both belts. Features on the top surface of the module and along the sides of the plastic belt can constrain its sideways deflection and provide a bearing surface along the edge. The secondary flat belt underneath can be a much thinner profile and there is less room to provide a bearing surface underneath the plastic belt to constrain the sidewise deflection of the flat belt underneath. Alternative methods can be used in the transfer module design to secure the secondary flat belt and control its deflection. A profile on the back of the belt can be used to interface with a mating profile on the drive rollers and on the conveyor bed that it rides on. This profile resists the sideways deflection of the belt instead of restraining it along the sides. Multiple profiles and mating grooves and even crowned rollers can be used in any combination to resist the most aggressive side loading.

A new transfer module assembly has a frame, a conveyor belt with internal rotating elements, where the conveyor belt is supported by the frame, conveyor drive rollers supported by the frame and configured to drive the conveyor belt, a flat transfer belt mounted beneath the conveyor belt and configured to contact undersides of the internal rotating elements of the conveyor belt in operation, and flat transfer belt drive rollers supported by the frame and configured to drive the flat transfer belt. The conveyor drive rollers are friction-based and operate without use of a sprocket, and have depressions for receiving the internal rotating elements of the conveyor belt.

In some embodiments, the depressions are grooves spaced to match a spacing of the internal rotating elements of the conveyor belt, a depth and geometry of the grooves being configured to provide multiple contact points between a surface of the conveyor belt and the conveyor drive rollers.

In some embodiments, the conveyor drive rollers have a friction coating, the friction coating including a rubberized sleeve or lagging.

In some embodiments, the conveyor belt and the flat transfer belt are configured to be driven in different directions. The direction in which the flat transfer belt is configured to be driven may be perpendicular to the direction in which the conveyor belt is configured to be driven. Tracking features on the flat transfer belt may be configured to resist deflection of the flat transfer belt. In some embodiments the tracking features include tracking grooves on the flat transfer belt drive rollers and features on the flat transfer belt that engage with the tracking grooves. In some embodiments, the assembly includes a low-friction slider bed support surface below the flat transfer belt, and the tracking features include tracking grooves incorporated in the slider bed that align with the tracking grooves in the flat transfer belt drive rollers.

In some embodiments, the conveyor drive rollers propel the conveyor belt using friction maintained by a catenary force of a return portion of the conveyor belt hanging underneath and between the conveyor drive rollers, and the conveyor drive rollers have no tensioning mechanisms.

In some embodiments the assembly includes a control unit configured to control speed and direction of movement of the conveyor belt and flat transfer belt, and the control unit is configured to control relative speed and direction of the conveyor belt and flat transfer belt to achieve movement of an object on the conveyor belt in a predetermined direction, where the predetermined direction may be any direction along a surface of the conveyor belt.

A new sorter includes a plurality of transfer module assemblies as described above arranged in series, an induction station configured to collect information about objects to be conveyed and to induct the objects onto the plurality of transfer module assemblies, zone sensors configured to determine progress of the objects on the plurality of transfer module assemblies, discharge bins configured to receive the objects from the plurality of transfer module assemblies, and a control system configured to receive data regarding the progress of the objects on the plurality of transfer module assemblies from the zone sensors and to activate transfer modules based on the received data to discharge the objects into appropriate discharge bins.

In some embodiments, each of the plurality of transfer modules assemblies is configured to be controlled by the control system independently.

A new sorter method includes placing a first object on a sorter as described above, tracking a position of the first object, determining a desired direction of movement for the first object, and controlling speed and direction of motion of the conveyor belt and flat transfer belt of the module on which the first object is positioned in order to move the first object in the desired direction.

A new transfer module assembly method includes providing a frame, supporting a conveyor belt with internal rotating elements on the frame, supporting conveyor drive rollers on the frame and configuring the conveyor drive rollers to drive the conveyor belt, mounting a flat transfer belt beneath the conveyor belt and configuring the flat transfer belt to contact undersides of the internal rotating elements of the conveyor belt in operation, and supporting flat transfer belt drive rollers on the frame and configuring the flat transfer belt drive rollers to drive the flat transfer belt. The conveyor drive rollers are friction-based and operate without use of a sprocket, and have depressions for receiving the internal rotating elements of the conveyor belt.

In some embodiments, the depressions include grooves spaced to match a spacing of the internal rotating elements of the conveyor belt, a depth and geometry of the grooves being configured to provide multiple contact points between a surface of the conveyor belt and the conveyor drive rollers.

In some embodiments, the conveyor drive rollers have a friction coating, the friction coating including a rubberized sleeve or lagging.

In some embodiments, the conveyor belt and the flat transfer belt are configured to be driven in perpendicular directions. The method may also include providing tracking features and configuring the tracking features to resist deflection of the flat transfer belt, and the tracking features may include tracking grooves on the flat transfer belt drive rollers and features on the flat transfer belt that engage with the tracking grooves. The method may also include providing a low-friction slider bed support surface below the flat transfer belt, the tracking features including tracking grooves incorporated in the slider bed that align with the tracking grooves in the flat transfer belt drive rollers.

In some embodiments, the conveyor drive rollers propel the conveyor belt using friction maintained by a catenary force of a return portion of the conveyor belt hanging underneath and between the conveyor drive rollers, and the conveyor drive rollers have no tensioning mechanisms.

In some embodiments, the method also includes providing a control unit configured to control speed and direction of movement of the conveyor belt and flat transfer belt, and configuring the control unit to control relative speed and direction of the conveyor belt and flat transfer belt to achieve movement of an object on the conveyor belt in a predetermined direction, wherein the predetermined direction may be any direction along a surface of the conveyor belt.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

This disclosure details package sorting transfer modules and systems and methods therefore. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention.

Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
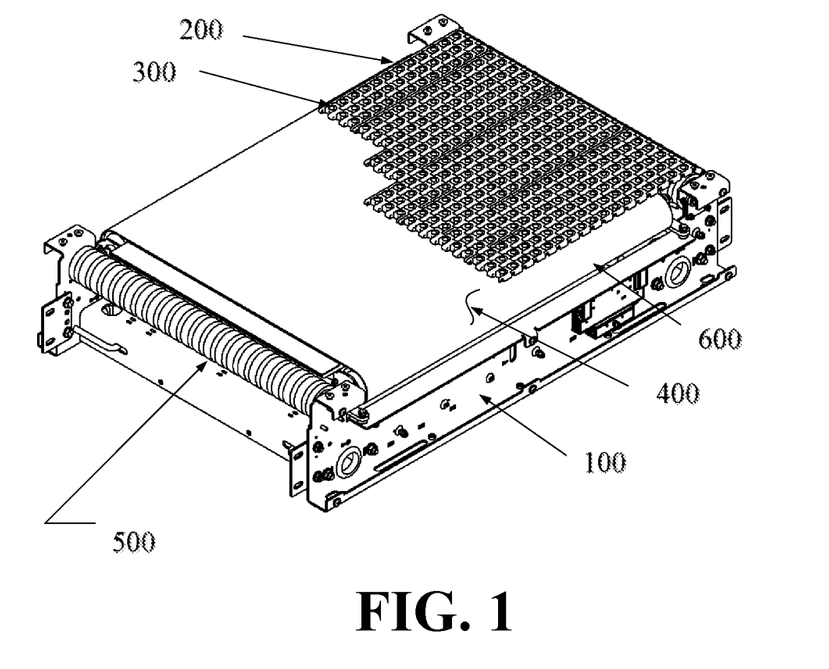
FIG. 1 illustrates a transfer module, according to an embodiment of the present invention.

FIG. 1 shows an overall depiction of a transfer module assembly, with the top conveyor belt partially cut away to expose the assembly beneath. A frame 100 provides the structural components to support the plastic conveyor belt 200 with internal rotating elements 300 mounted above the flat transfer belt 400. The frame supports the plastic conveyor drive rollers 500 and the flat transfer belt drive rollers 600 mounted at 90 degrees and underneath. With this configuration the rotating elements of the plastic conveyor belt move over the flat transfer belt which can be activated and move to the right or left and at 90 degrees to the direction of motion of the plastic conveyor belt.

Figure 2:
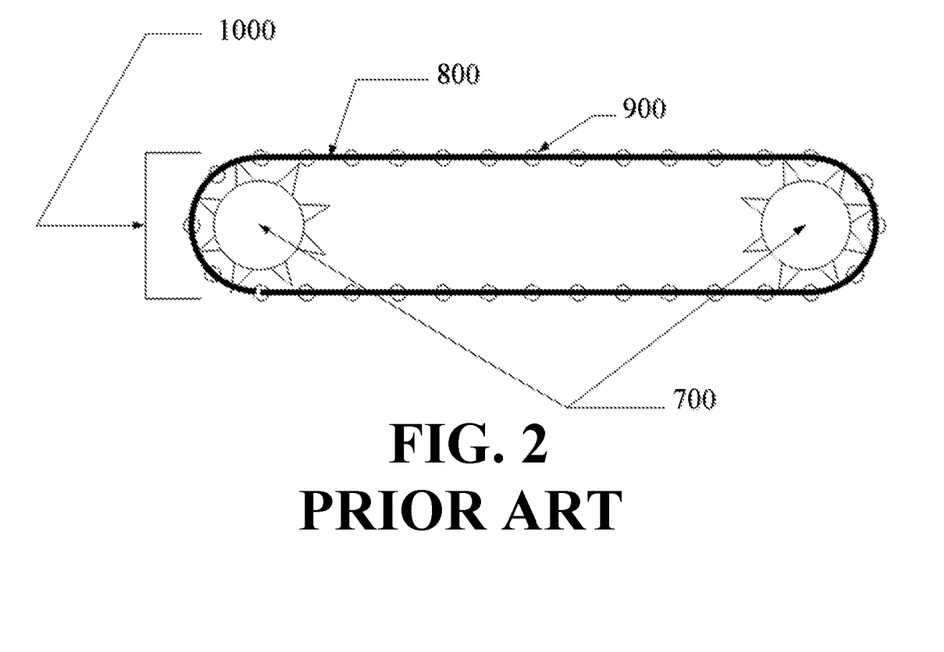
FIG. 2 illustrates a sprocket drive, according to an embodiment of the present invention.

FIG. 2 shows a traditional way that a plastic conveyor belt interfaces with a drive roller using a sprocket style drive roller 700 to engage the plastic conveyor belt 800 with rotating elements 900 and provide motive power. The sprocket drive design results in a larger diameter nose roller 1000 because of the clearance required to establish teeth onto a cylindrical roller. One or more sprockets are used over the length of the drive roller.

Figure 3:
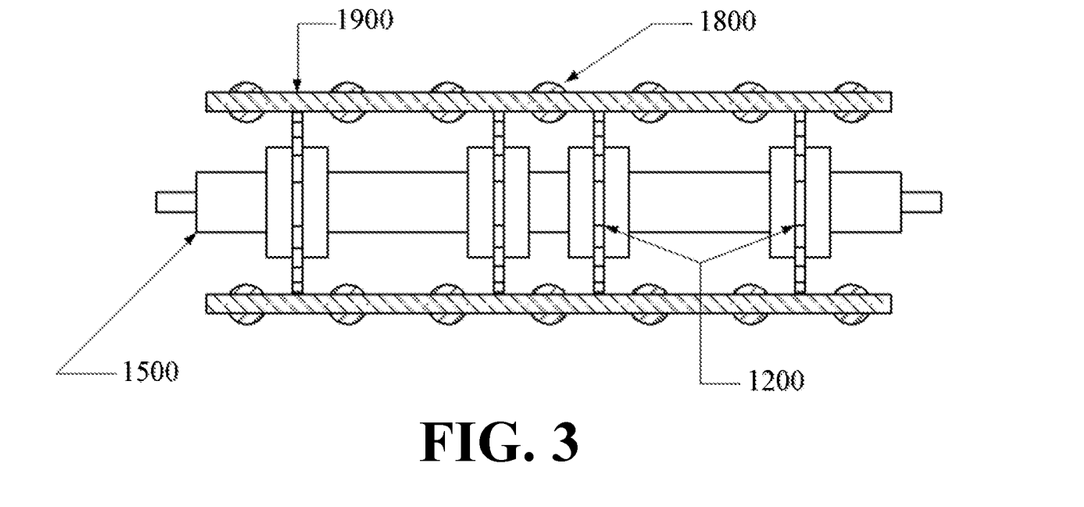
FIG. 3 illustrates a sprocket drive shaft, according to an embodiment of the present invention.

FIG. 3 shows a representative sprocket drive system where a common shaft 1500 is outfitted with multiple sprockets 1200. The sprockets engage features in the plastic conveyor chain 1900 to provide the motive force. The rotating elements 1800 are free of the sprocket engagement area and can rotate.

Figure 4:
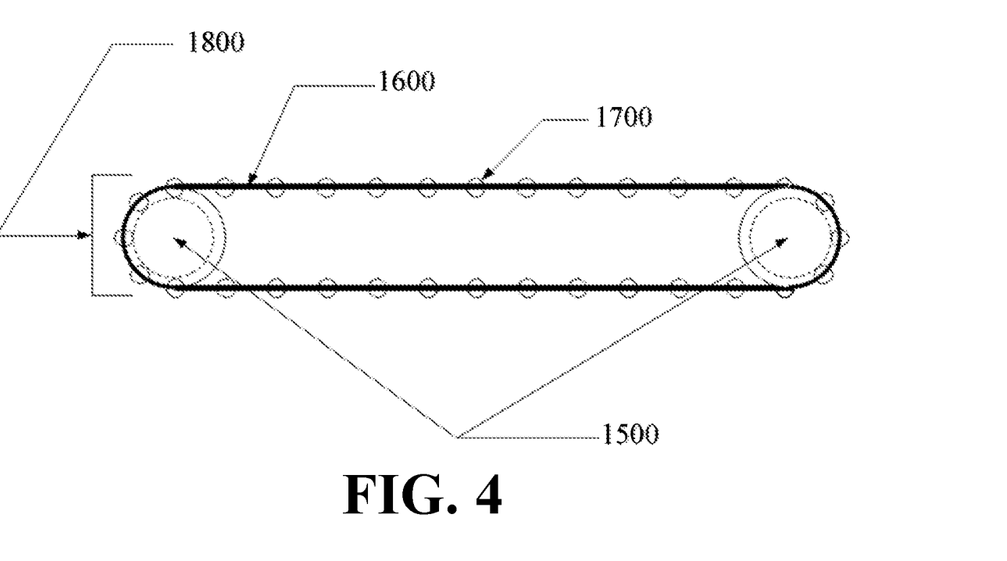
FIG. 4 illustrates a roller drive, according to an embodiment of the present invention.

FIG. 4 shows the roller-style drive roller 1500 approach where the plastic conveyor belt 1600 with rotating elements 1700 runs in a continuous loop using the friction of the drive roller 1500 to transmit the driving force. The roller approach results in a small diameter nose roller 1800 since there are no raised teeth required to interface with the plastic conveyor belt.

The roller can have a minimal diameter and can be smooth. A very cost-effective approach is to simply cover a commercially available drive roller with a rubberized coating and then cut shallow grooves in it to accommodate the rotating elements that extend below the conveyor belt. The smaller diameter nose roller is a very important feature when connecting multiple transfer modules together. The smaller diameter rollers minimize "valley" between adjacent transfer units and allow the transport of smaller packages than could be processed with a sprocket driven conveyor.

Figure 5:
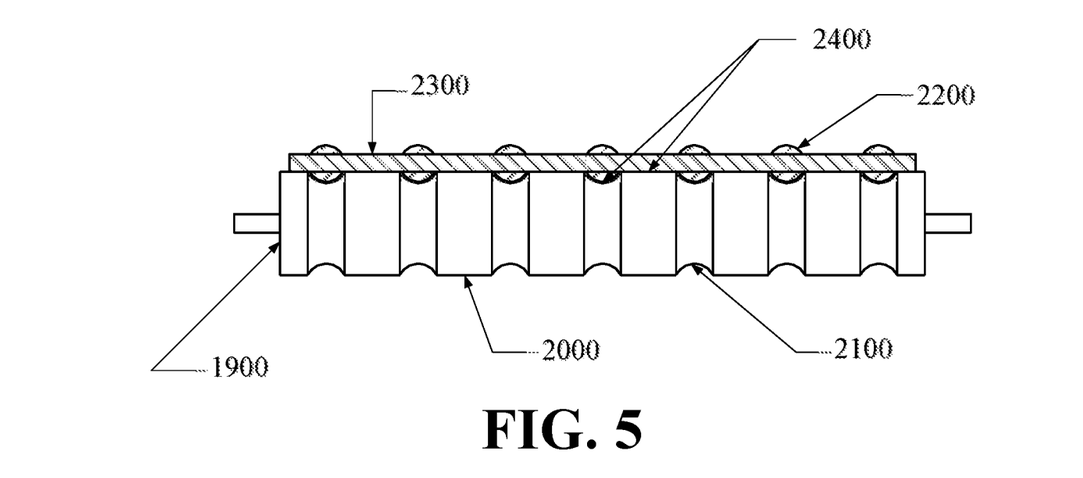
FIG. 5 illustrates a drive roller, according to an embodiment of the present invention.

FIG. 5 provides a detailed view of the grooved friction drive roller 1900. The drive roller incorporates a friction coating 2000 that may be a rubberized sleeve or lagging that has been attached to the outside of the roller. This rubberized sleeve incorporates grooves 2100 that are evenly spaced and match the spacing of the rotating elements 2200 incorporated in the plastic conveyor belt 2300. The depth and geometry of the grooves is selected so that there are multiple contact points 2400 between the surface of the plastic conveyor belt and the drive roller 1900. In this embodiment the geometry of the grooves in the roller is designed to contact the rotating elements of the conveyor as well as the conveyor itself to assure that a very small package could not get stalled in a dead zone where the rotating elements slipped and turned freely without providing motive power.

Figure 6:
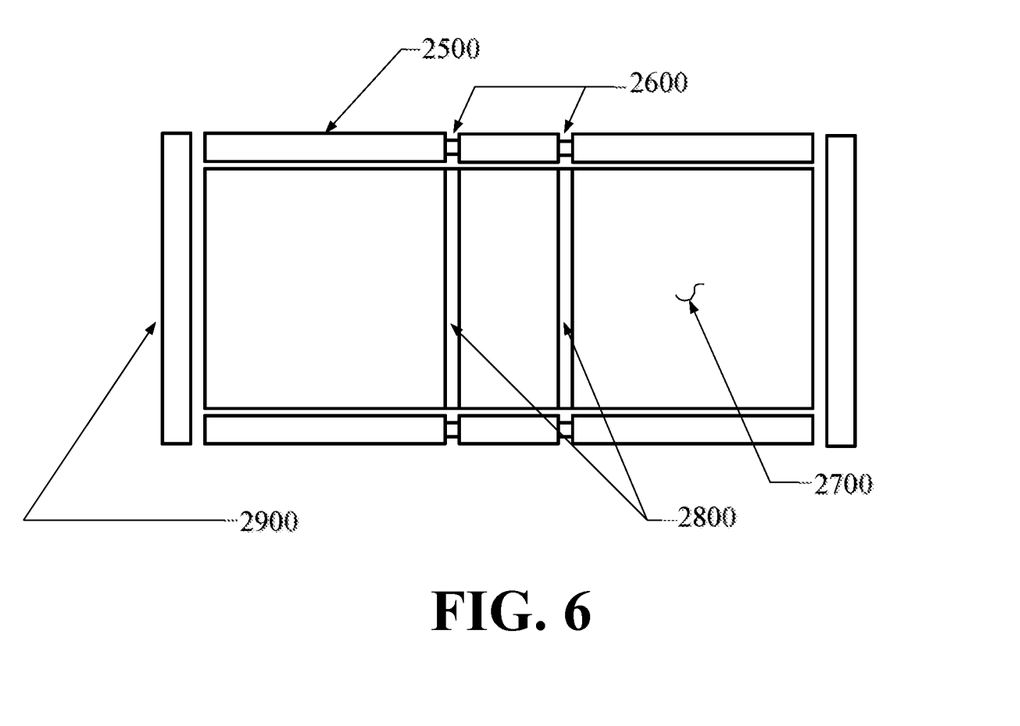
FIG. 6 illustrates tracking features, according to an embodiment of the present invention.

Tracking features are used to resist deflection of the flat transfer belt as illustrated in FIG. 6. The flat transfer belt drive rollers 2500 may be equipped with one or more tracking grooves 2600 that engage features on the flat transfer belt itself (shown in FIG. 7). The slider bed 2700 is a low friction support surface below the flat transfer belt. Tracking grooves 2800 are also incorporated in the slider bed and these align with the tracking grooves in the transfer belt drive rollers. These tracking features are provided for the flat transfer belt which runs underneath the plastic conveyor belt that runs at 90 degrees to the transfer belt and is driven by the plastic drive belt rollers 2900.

Figure 7:
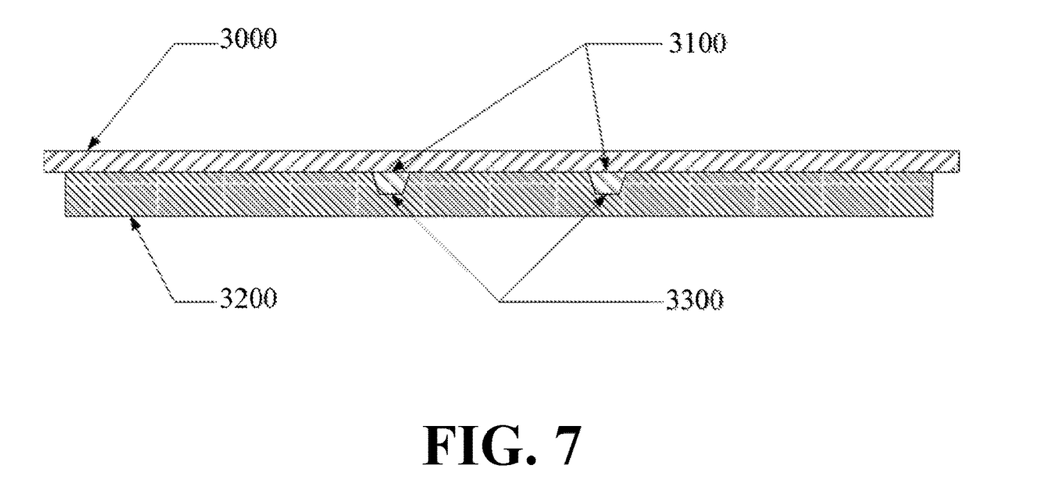
FIG. 7 illustrates a transfer belt and slider bed interface, according to an embodiment of the present invention.

FIG. 7 illustrates a transfer belt and slider bed interface, according to an embodiment of the invention. The flat transfer belt 3000 may incorporate one or more belt tracking profiles 3100 attached to the back side. The flat transfer belt is supported by a low friction slider bed 3200 and this surface incorporates tracking grooves 3300 that align with the tracking features (i.e. 3100) of the flat transfer belt. There are many possible configurations for the shape of the grooves and the tracking profiles of the flat transfer belt, including passive designs as shown or even active designs where there are rollers or other features that resist the deflection of the transfer belt. These features prevent the top conveyor belt (e.g. 2300) from deflecting the flat transfer belt 3000 in the direction of motion of the top conveyor belt.

Figure 8:
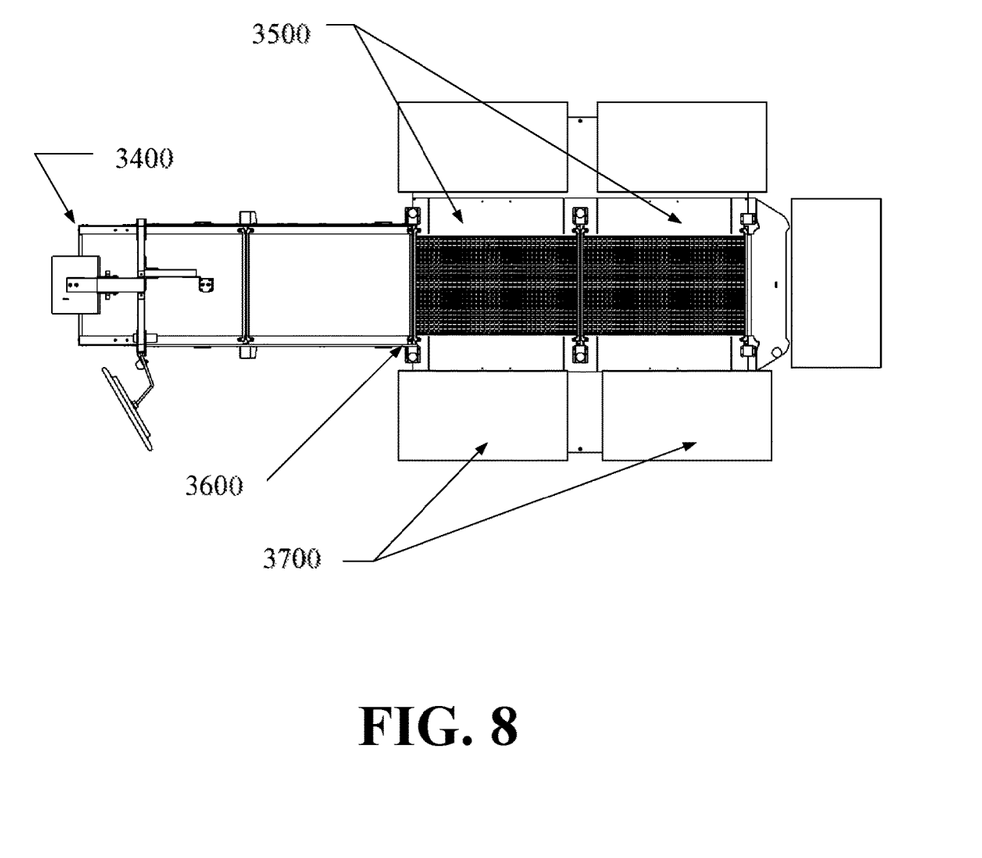
FIG. 8 illustrates a sorter configuration, according to an embodiment of the present invention.

FIG. 8 shows transfer modules combined to form a modular sorter system according to an embodiment of the present invention. For this application an induction station 3400 is used to input packages into the sorter. Data is collected from scanners or other means and the package is inducted onto a string of one or more transfer modules 3500.

Packages are transferred from one module to another and their progress is determined by zone sensors 3600 or other means such as calculation of the package position by the control system. Zone sensors 3600 may for example be photoelectric sensors, also called "photo eyes", and/or in some embodiments, ultrasonic motion sensors, cameras, radar, laser scanner, etc. When the package reaches the transfer module that services the appropriate bin discharge 3700, the transfer module activates and discharges the package into the correct discharge bin. This modular sorter solution can be expanded or reduced by simply adding or taking away transfer modules. This approach provides a scalable solution that can be easily changed to meet changing processing requirements.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A transfer module assembly, comprising:
    a frame;
    a conveyor belt with internal rotating elements, wherein the conveyer belt is supported by the frame;
    conveyor drive rollers supported by the frame and configured to drive the conveyor belt;
    a flat transfer belt mounted beneath the conveyor belt and configured to contact undersides of the internal rotating elements of the conveyor belt in operation; and
    flat transfer belt drive rollers supported by the frame and configured to drive the flat transfer belt;
    wherein the conveyor drive rollers are friction-based and operate without use of a sprocket, and comprise depressions configured to receive protruding lower portions of the internal rotating elements of the conveyor belt;
    wherein the protruding lower portions of the internal rotating elements are configured to engage with an inner surface of the depressions to lock rotation of the internal rotating elements.

2. The assembly of claim 1, wherein the depressions comprise grooves spaced to match a spacing of the internal rotating elements of the conveyor belt, a depth and geometry of the grooves being configured to provide multiple contact points between a surface of the conveyor belt and the conveyor drive rollers.

3. The assembly of claim 1, wherein the conveyor drive rollers comprise a friction coating, the friction coating comprising a rubberized sleeve or lagging.

4. The assembly of claim 1, wherein the conveyor belt and the flat transfer belt are configured to be driven in different directions.

5. The assembly of claim 4, wherein the direction in which the flat transfer belt is configured to be driven is perpendicular to the direction in which the conveyor belt is configured to be driven.

6. The assembly of claim 4, further comprising tracking features configured to resist deflection of the flat transfer belt.

7. The assembly of claim 6, wherein the tracking features comprise tracking grooves on the flat transfer belt drive rollers and features on the flat transfer belt that engage with the tracking grooves.

8. The assembly of claim 7, further comprising a low-friction slider bed support surface below the flat transfer belt, wherein the tracking features comprise tracking grooves incorporated in the slider bed that align with the tracking grooves in the flat transfer belt drive rollers.

9. The assembly of claim 4, further comprising a control unit configured to control speed and direction of movement of the conveyor belt and flat transfer belt, wherein the control unit is configured to control relative speed and direction of the conveyor belt and flat transfer belt to achieve movement of an object on the conveyor belt in a predetermined direction, wherein the predetermined direction may be any direction along a surface of the conveyor belt.

10. The assembly of claim 1, wherein the conveyor drive rollers propel the conveyor belt using friction maintained by a catenary force of a return portion of the conveyor belt hanging underneath and between the conveyor drive rollers, wherein the conveyor drive rollers have no tensioning mechanisms.

11. A sorter, comprising;
    a plurality of transfer module assemblies according to claim 1 arranged in series;
    an induction station configured to collect information about objects to be conveyed and to induct the objects onto the plurality of transfer module assemblies;
    zone sensors configured to determine progress of the objects on the plurality of transfer module assemblies;
    discharge bins configured to receive the objects from the plurality of transfer module assemblies; and
    a control system configured to receive data regarding the progress of the objects on the plurality of transfer module assemblies from the zone sensors and to activate transfer modules based on the received data to discharge the objects into appropriate discharge bins.

12. The sorter of claim 11, wherein each of the plurality of transfer modules assemblies is configured to be controlled by the control system independently.

13. A sorter method, comprising:
    placing a first object on the sorter of claim 11;
    tracking a position of the first object;
    determining a desired direction of movement for the first object; and
    controlling speed and direction of motion of the conveyor belt and flat transfer belt of the module on which the first object is positioned in order to move the first object in the desired direction.

14. The assembly of claim 1, wherein the depressions comprise a plurality of circumferential grooves.

15. A transfer module assembly method, comprising:
    providing a frame;
    supporting a conveyor belt with internal rotating elements on the frame;
    supporting conveyor drive rollers on the frame and configuring the conveyor drive rollers to drive the conveyor belt;
    mounting a flat transfer belt beneath the conveyor belt and configuring the flat transfer belt to contact undersides of the internal rotating elements of the conveyor belt in operation; and supporting flat transfer belt drive rollers on the frame and configuring the flat transfer belt drive rollers to drive the flat transfer belt;

wherein the conveyor drive rollers are friction-based and operate without use of a sprocket, and comprise depressions for receiving the internal rotating elements of the conveyor belt;

wherein the depressions are spaced to match a spacing of the internal rotating elements of the conveyor belt, a depth and geometry of the depressions being configured to contact bottom protruding portions of the internal rotating elements.

16. The method of claim 15, wherein the conveyor drive rollers comprise a friction coating, the friction coating comprising a rubberized sleeve or lagging.

17. The method of claim 15, further comprising configuring the conveyor belt and the flat transfer belt to be driven in perpendicular directions.

18. The method of claim 17, further comprising providing tracking features and configuring the tracking features to resist deflection of the flat transfer belt, wherein the tracking features comprise tracking grooves on the flat transfer belt drive rollers and features on the flat transfer belt that engage with the tracking grooves, further comprising providing a low-friction slider bed support surface below the flat transfer belt, wherein the tracking features comprise tracking grooves incorporated in the slider bed that align with the tracking grooves in the flat transfer belt drive rollers.

19. The method of claim 17, further comprising providing a control unit configured to control speed and direction of movement of the conveyor belt and flat transfer belt, and configuring the control unit to control relative speed and direction of the conveyor belt and flat transfer belt to achieve movement of an object on the conveyor belt in a predetermined direction, wherein the predetermined direction may be any direction along a surface of the conveyor belt.

20. The method of claim 15, wherein the conveyor drive rollers propel the conveyor belt using friction maintained by a catenary force of a return portion of the conveyor belt hanging underneath and between the conveyor drive rollers, wherein the conveyor drive rollers have no tensioning mechanisms.

21. The assembly of claim 15, wherein the depressions comprise a plurality of circumferential grooves.

\* \* \* \* \*